(12) United States Patent
Murota (10) Patent No.: US 11,493,169 B2
(45) Date of Patent: Nov. 8, 2022

(54) SUPPORT STRUCTURE (71) Applicant: FANUC CORPORATION, Minamitsuru-gun (JP)

(72) Inventor: Masahiro Murota, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 54 days.

(21) Appl. No.: 17/100,408

(22) Filed: Nov. 20, 2020

(65) Prior Publication Data
US 2021/0164611 A1 Jun. 3, 2021

(30) Foreign Application Priority Data
Nov. 29, 2019 (JP) .............................. JP2019-216604

(51) Int. Cl.
| B23Q 11/08 | (2006.01) |
| F16C 29/00 | (2006.01) |
| F16M 13/00 | (2006.01) |
| F16M 13/02 | (2006.01) |
| B23Q 1/38 | (2006.01) |
| F16C 19/02 | (2006.01) |
| B23Q 1/25 | (2006.01) |

(52) U.S. Cl.
CPC ......... *F16M 13/022* (2013.01); *F16C 29/004* (2013.01); *F16C 29/005* (2013.01); *B23Q 1/25* (2013.01); *F16C 19/02* (2013.01)

(58) Field of Classification Search
CPC ... F16M 13/022; F16C 29/004; F16C 29/005; B23Q 1/38; B23Q 11/0816; B23Q 11/0825
See application file for complete search history.

(56) References Cited

U.S. PATENT DOCUMENTS

| 10,280,976 B2 * | 5/2019 | Minami ................ F16C 41/005 |
| 2018/0066701 A1 | 3/2018 | Minami et al. |
| 2021/0162555 A1 * | 6/2021 | Murota ................ F16C 29/005 |

FOREIGN PATENT DOCUMENTS

| JP | 2001153226 A | * | 6/2001 |
| JP | 2008264888 A | * | 11/2008 |
| JP | 2018-039061 A | | 3/2018 |

* cited by examiner

*Primary Examiner* — Tan Le
(74) *Attorney, Agent, or Firm* — McGinn I.P. Law Group, PLLC.

(57) ABSTRACT

A support structure includes: a support frame as a shaft support member for supporting two shafts; a bush provided on each of the two shafts in a slidable manner; a cover support member connected to the multiple bushes and configured to support the cover; a first connection member for connecting one end of each of the two shafts to the support frame in a manner that the relative position between the shaft and the support frame will not change; and a second connection member for connecting the other end of each of the two shafts to the support frame in a manner that the relative position between the shaft and the support frame can change.

15 Claims, 13 Drawing Sheets

SUPPORT STRUCTURE

CROSS-REFERENCE TO RELATED APPLICATION

This application is based upon and claims the benefit of priority from Japanese Patent Application No. 2019-216604 filed on Nov. 29, 2019, the contents of which are incorporated herein by reference.

BACKGROUND OF THE INVENTION

Field of the Invention

The present invention relates to a support structure that supports an expandable cover.

Description of the Related Art

Japanese Laid-Open Patent Publication No. 2018-039061 discloses a support structure of a cover (bellows) that can expand and contract in the moving direction of a slide table. This support structure includes a pair of shafts arranged substantially parallel to the moving direction of the slide table, a pair of bushes provided slidably on the respective shafts, and a cover supporting member that is attached to the pair of bushes to support a cover.

SUMMARY OF THE INVENTION

In the support structure of Japanese Laid-Open Patent Publication No. 2018-039061, in some cases, the pair of shafts are not installed in parallel. In this case, since one of the paired shafts is skewed or inclined with respect to the other, the distance between the shafts becomes uneven, so that the movable range (slidable range) of the bushes on the shafts is reduced.

It is therefore an object of the present invention to provide a support structure capable of suppressing the reduction of the movable range of the bushes even when the shafts are not installed in parallel.

According to an aspect of the present invention, a support structure for supporting an expandable cover includes: at least two shafts extending in a first direction in which the cover expands and contracts, and arranged inside the cover so as to be spaced from each other in a second direction that intersects the first direction; a shaft support member configured to support the at least two shafts; a bush provided on each of the at least two shafts and configured to be slidable along the shaft; a cover support member connected to a plurality of the bushes and configured to support the cover; a first connection member configured to connect one end of each of the at least two shafts to the shaft support member so as not to change the relative position between the shaft and the shaft support member; and a second connection member configured to connect another end of each of the at least two shafts to the shaft support member in a manner that the relative position between the shaft and the shaft support member is changeable.

According to the present invention, it is possible to suppress the reduction of the movable range of the bushes even when the shafts are not installed in parallel.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the present invention will be described below in detail with reference to the accompanying drawings.

Embodiment

[Structure of Slide Table Device]

Figure 1:
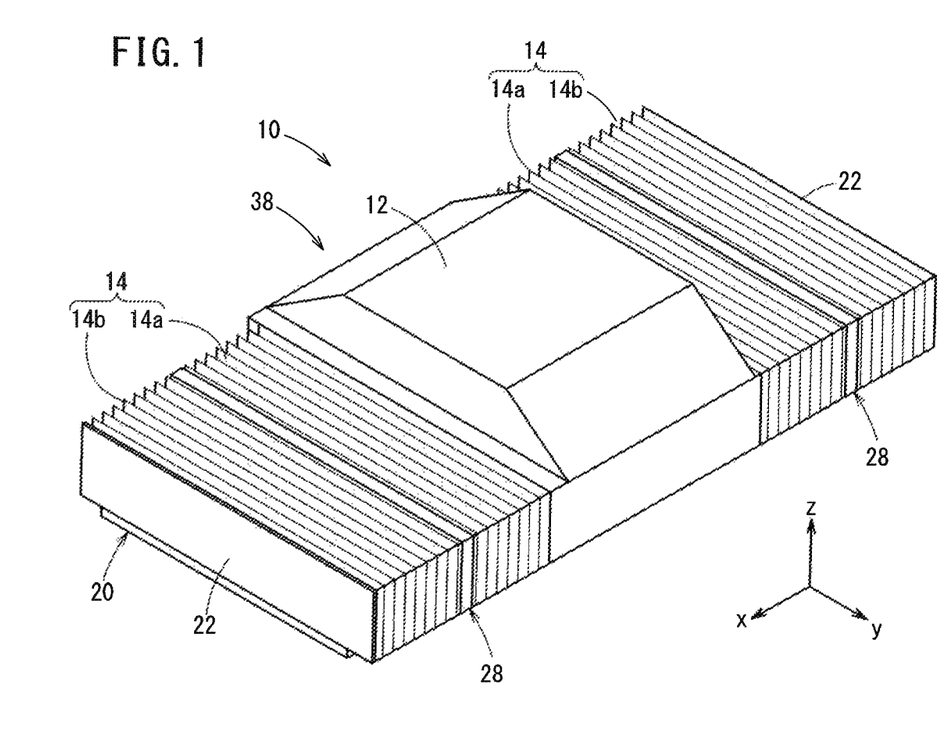
FIG. 1 is a schematic view of a slide table device of an embodiment.

FIG. 1 is a schematic view of a slide table device 10. The slide table device 10 is used for a machine tool that processes (machines) a workpiece with a tool, a measuring machine having a moving mechanism, or the like. The slide table device 10 has a movable table 12 along a first direction (x-axis direction) in which the x-axis of FIG. 1 extends. Expandable covers 14 are provided respectively on both sides of the table 12 in the moving direction (i.e., on the x-axis positive direction side and the x-axis negative direction side).

The cover 14 is formed so as to have a bellows-shape and serves to prevent liquid, such as a coolant ejected to a processed portion, or foreign material such as cutting chips generated during machining, from entering the interior. The covers 14 are provided respectively on the x-axis positive direction side and the x-axis negative direction side with the table 12 interposed therebetween. The cover 14 on the x-axis positive direction side and the cover 14 on the x-axis negative direction side expand and contract along the first direction (x-axis direction) in conjunction with the movement of the table 12. When the table 12 moves in the x-axis positive direction, the cover 14 on the x-axis positive direction side contracts along the first direction (x-axis direction) while the cover 14 on the x-axis negative direction side expands in the first direction (x-axis direction). When the table 12 moves to the negative direction side of the x-axis, the cover 14 on the x-axis negative direction side contracts along the first direction (x-axis direction) while the cover 14 on the x-axis positive direction side expands in the first direction (x-axis direction).

Figure 2:
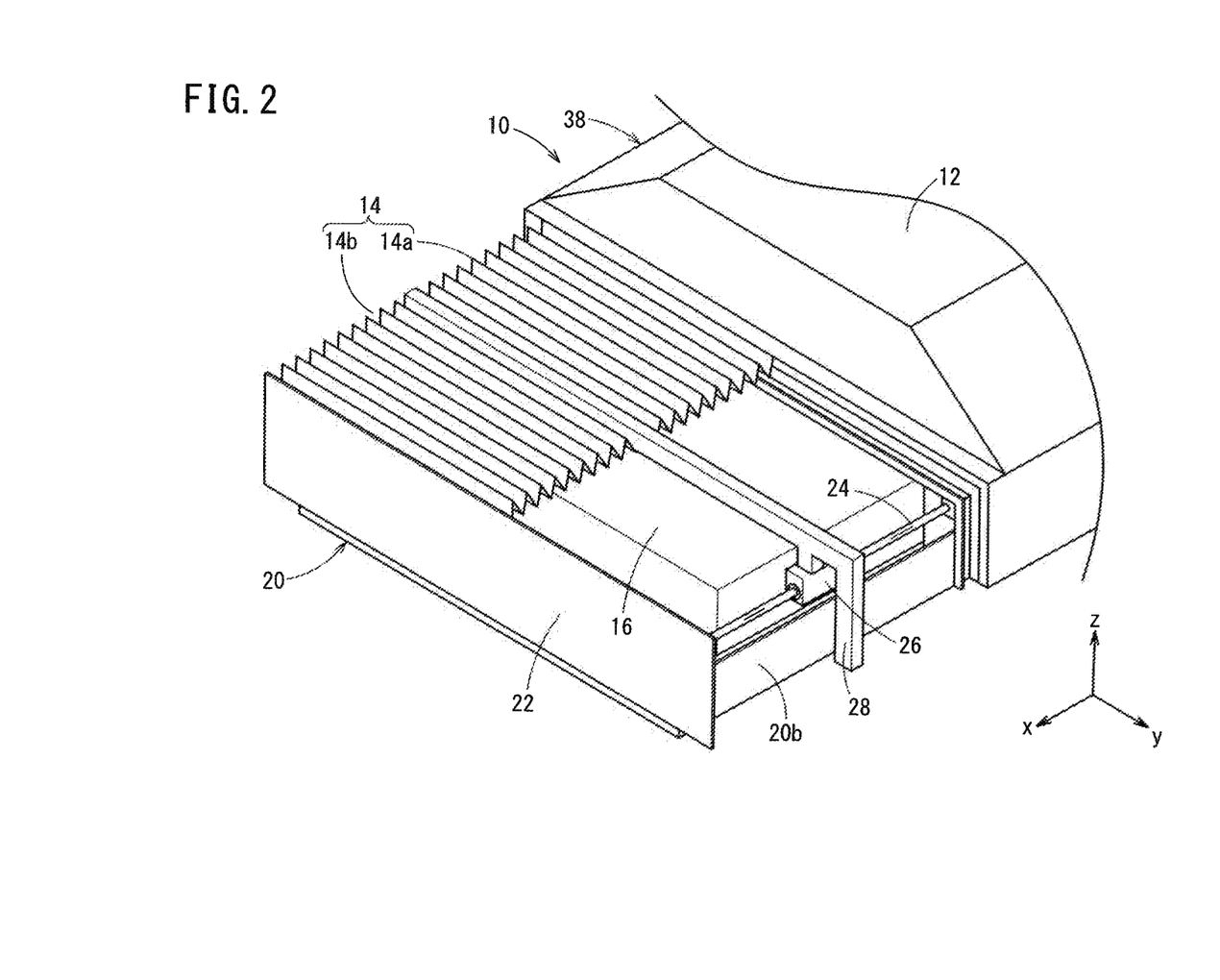
FIG. 2 is a schematic view of a state in which a part of the cover of FIG. 1 is cut out.
Figure 3:
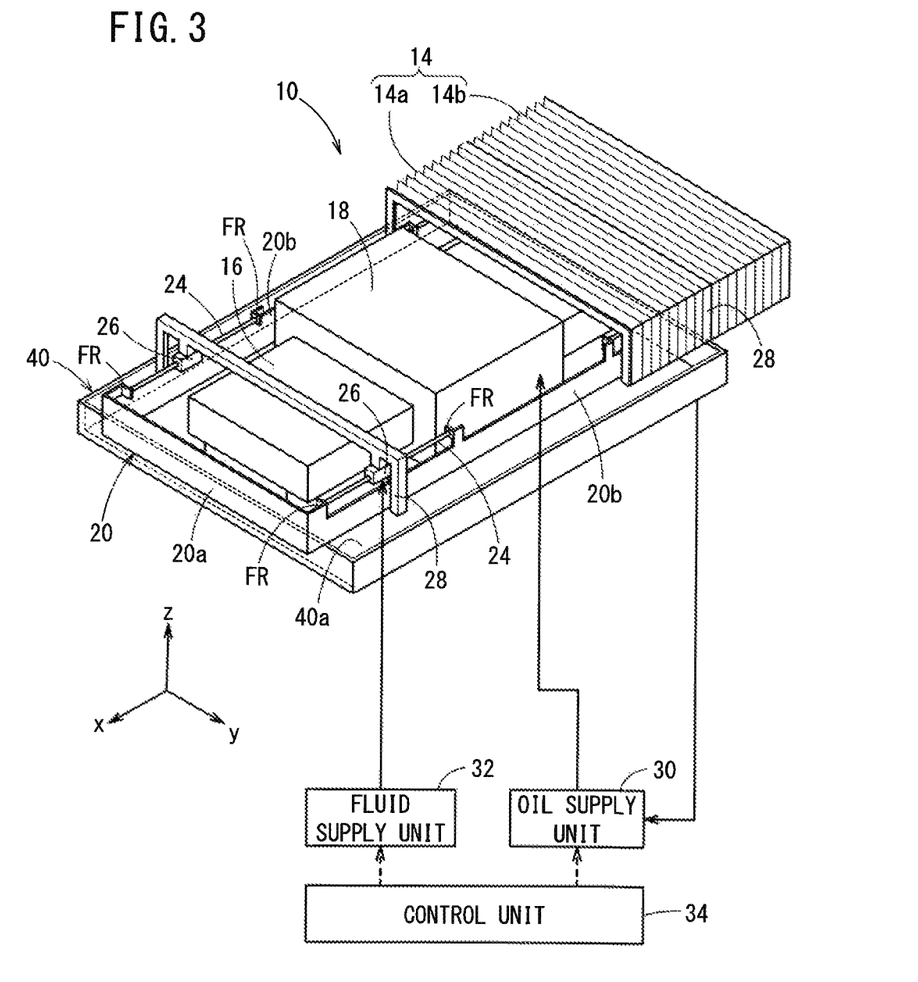
FIG. 3 is a schematic view of a state in which the table and a part of covers of FIG. 1 is removed.
Figure 4:
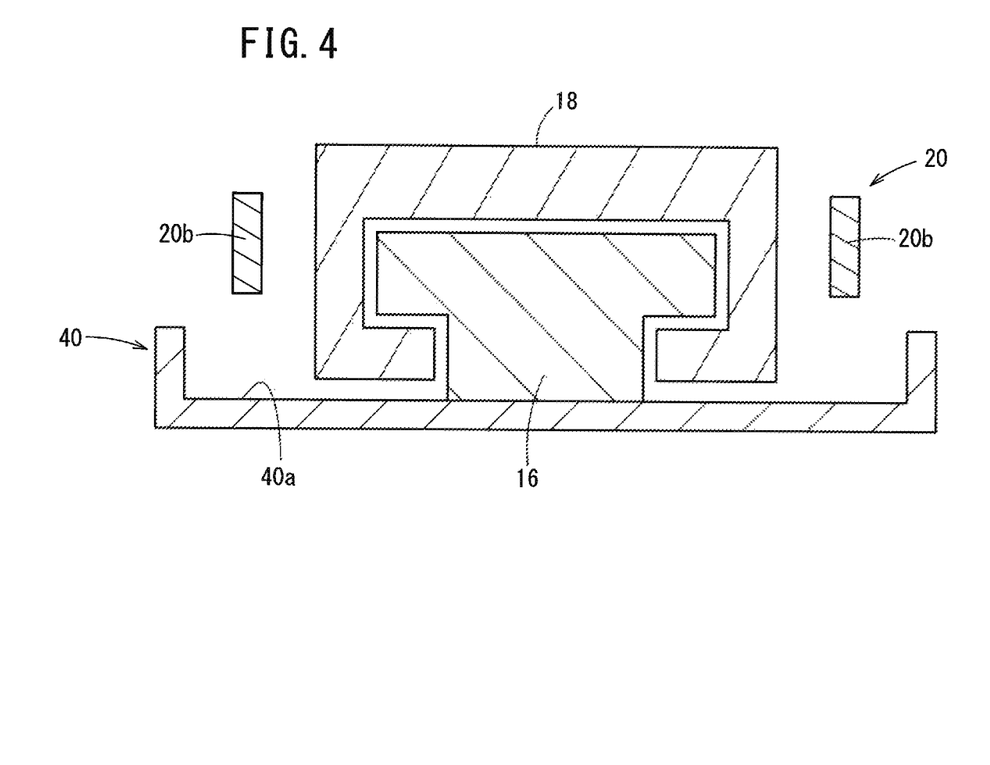
FIG. 4 is a schematic sectional view showing a guide rail and slide in FIG. 3.

FIG. 2 is a schematic view of a state in which a part of the cover 14 of FIG. 1 is cut out, FIG. 3 is a schematic view of a state in which the table 12 and a part of the covers 14 of FIG. 1 is removed, and FIG. 4 is a schematic sectional view of a guide rail 16 and a slide 18 in FIG. 3.

The slide table device 10 includes a guide rail 16, a slide 18 and an oil pan 40. The oil pan 40 is formed in a box shape with its top open. The guide rail 16 is fixed to a bottom 40a of the oil pan 40 (see FIGS. 3 and 4). The guide rail 16 is formed so as to extend in the first direction (x-axis direction). When the guide rail 16 is viewed from the first direction (x-axis direction), the cross section of the guide rail 16 is formed in a substantially T shape (see FIG. 4). The slide 18 is provided over the guide rail 16. When the slide 18 is viewed from the first direction (x-axis direction), the slide 18 is arranged so as to straddle the upper part of the guide rail 16 (see FIG. 4). The slide 18 is driven by an unillustrated driving device along the guide rail 16 in the x-axis positive direction and the x-axis negative direction. The table 12 is supported by the slide 18. The table 12 moves integrally with the slide 18 to the x-axis positive direction side and the x-axis negative direction side. The table 12 and the slide 18 constitute a slide table 38.

The slide table device 10 has a support frame 20 that encloses the outsides of the guide rail 16 and the slide 18 around the entire circumference (see FIG. 3). The support frame 20 is formed as a rectangular frame shape that opens upward and downward. The support frame 20 is arranged above the oil pan 40 (see FIG. 4) and is fixed to the oil pan 40 through unillustrated fixation members. The support frame 20 has a pair of side walls 20a opposing each other in the longitudinal direction of the support frame 20 and a pair of side walls 20b opposing each other in the lateral direction of the support frame 20.

The x-axis positive direction side cover 14 and the x-axis negative direction side cover 14 are provided so as to straddle the outer sides of the side wall 20b of the support frame 20 (see FIG. 1). An end of the x-axis positive direction side cover 14 that lies on the table 12 side is attached to the table 12 while the other end of the cover 14 that faces away from the table 12 is attached to a fixing plate 22 fixed to the outer surface of the side wall 20a of the support frame 20 (see FIG. 2). An end of the x-axis negative direction side cover 14 that lies on the table 12 side is attached to the table 12 while the other end of the cover 14 that faces away from the table 12 is attached to another fixing plate 22 fixed to the outer surface of the side wall 20a of the support frame 20 (see FIG. 1). Thus, the exteriors of the side walls 20a and the side walls 20b of the support frame 20 and the upper opening of the support frame 20 are covered with the table 12, the covers 14 and the fixing plates 22.

[Slide Support Structure]

A gap is formed between the guide rail 16 and the slide 18 (see FIG. 4). Hydraulic oil is supplied into the gap by an oil supply unit 30 (see FIG. 3). The oil supply unit 30 is controlled by a control unit 34, and supplies hydraulic oil into the gap between the guide rail 16 and the slide 18 at a constant pressure. This creates an oil bearing between the guide rail 16 and the slide 18, so that the slide 18 is held in a floating state with respect to the guide rail 16.

Since the guide rail 16 and the slide 18 do not directly contact each other, friction between the guide rail 16 and the slide 18 is only due to viscous resistance of the hydraulic oil. Therefore, the friction between the guide rail 16 and the slide 18 is greatly reduced as compared with the friction between the guide rail 16 and the slide 18 when rollers or the like are provided between the guide rail 16 and the slide 18. The oil supply unit 30 includes a strainer for filtering the hydraulic oil, a pump for sending the hydraulic oil, and the like. The oil supply unit 30 draws in the hydraulic oil stored in the oil pan 40, and supplies the hydraulic oil to the gap between the guide rail 16 and the slide 18. The hydraulic oil that has flowed out from the gap between the guide rail 16 and the slide 18 is recirculated back to the oil pan 40 and is stored therein.

[Cover Support Structure]

The support structure of the x-axis positive direction side cover 14 and the support structure of the x-axis negative direction side cover 14 are the same, and only the support structure of the x-axis positive direction side cover 14 will thus be described.

Two shafts 24 are attached to the support frame 20. The support frame 20 is a shaft support member that supports the shafts 24. In the support frame 20, each of the side walls 20b that face each other in the lateral direction of the support frame 20 has a pair of flanges FR protruding inward from the corresponding side wall 20b. The paired flanges FR face each other in the first direction (x-axis direction) along which the cover 14 expands and contracts. The shaft 24 is arranged between the paired flanges FR on each side wall 20b of the support frame 20, and is fixed to the flanges FR so that the two shafts 24 are attached to the support frame 20. The two shafts 24 are spaced from each other in a second direction that intersects the first direction in which the cover 14 expands and contracts, and the shafts 24 extend in the first direction. In the present embodiment, the second direction is the y-axis direction that is perpendicular to the first direction (x-axis direction) in the horizontal plane.

Each of the two shafts 24 is provided with a bush (bushing) 26 that can slide on the shaft 24. Each bush 26 is connected to a cover support member 28 for supporting the cover 14. The cover support member 28 is attached to the cover 14 with part of the cover support member being exposed to the outside of the cover 14 (see FIGS. 1 and 2). The cover 14 is divided into a first cover portion 14a located on the side closer to the table 12 and a second cover portion 14b located on the side farther from the table 12 while the aforementioned part of the cover support member 28 is located between the first cover portion 14a and the second cover portion 14b. By fixing each of the first cover portion 14a and the second cover portion 14b to the cover support member 28 that is arranged between the first cover portion 14a and the second cover portion 14b, the cover support member 28 is attached to the cover 14. The cover support member 28 moves together with the bushes 26 along the shafts 24.

A fluid such as air is supplied between the bush 26 and the shaft 24 by a fluid supply unit 32. The fluid supply unit 32 is controlled by the control unit 34 so as to supply a fluid between the bush 26 and the shaft 24 at a predetermined pressure. This creates a fluid bearing between the bush 26 and the shaft 24, so that the bush 26 is held in a floating state with respect to the shaft 24. Since the bush 26 and the shaft 24 do not come into direct contact with each other, the friction between the bush 26 and the shaft 24 is only due to the viscous resistance of the fluid. Therefore, the friction between the bush 26 and the shaft 24 is greatly reduced as compared with the friction between the bush 26 and the shaft 24 when the bush 26 and the shaft 24 are in contact with each other. The fluid supply unit 32 includes a filter for removing dust and the like from the sucked air, a pump for sending the fluid, and the like.

Figure 5:
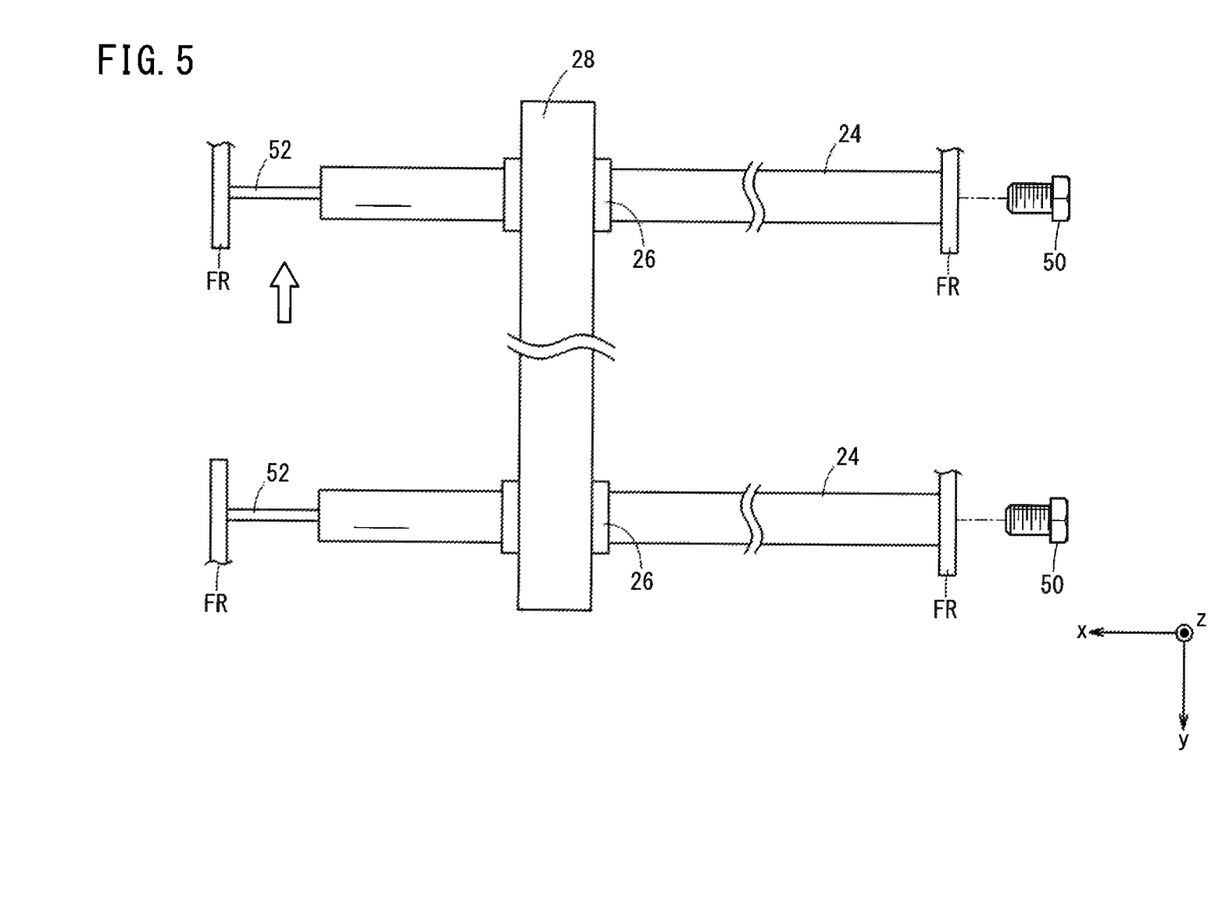
FIG. 5 is a schematic view of shafts, viewed from top.
Figure 6:
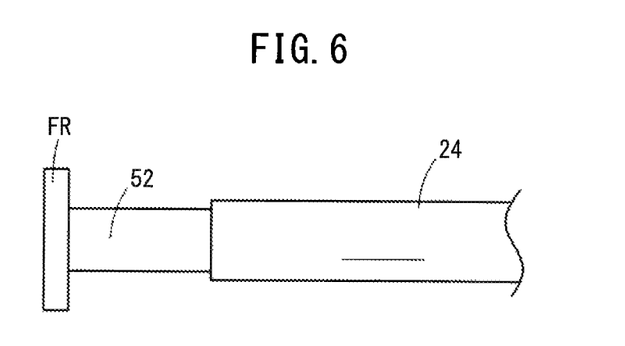
FIG. 6 is a schematic view when viewed from the direction of the arrow in FIG. 5.

The above shaft 24 will be described in more detail. FIG. 5 is a schematic view of the shafts 24 viewed from above, and FIG. 6 is a schematic view of the shaft 24 viewed from the direction of the arrow in FIG. 5. In FIG. 5, the guide rail 16, the slide 18, the oil pan 40 and the like are omitted.

A first end (one end) of each of the two shafts 24 is fixed to the flange FR of the support frame 20 by means of a first connection member 50. Each of the first connection members 50 connects the first end of the shaft 24 to the support frame 20 (flange FR) in such a manner that the relative position of the shaft 24 with respect to the support frame 20 will not change. Each of the first connection members 50 is an adhesive, a screw bolt, or the like.

The second end (the other end) of each of the two shafts 24 is fixed to the flange FR of the support frame 20 by a second connection member 52. Each of the second connection members 52 connects the second end of the shaft 24 to the support frame 20 (flange FR) in such a manner that the relative position of the shaft 24 with respect to the support frame 20 can change. Each second connection member 52 is a flat spring (plate spring) in this embodiment. The second connection member 52 (flat spring) may be integrally formed with the shaft 24, or may be formed separately from the shaft 24. When the second connection member 52 (flat spring) is formed separately from the shaft 24, the second connection member 52 (flat spring) is fixed to the shaft 24 with an adhesive, a screw bolt, or the like. Also, the second connection member 52 (flat spring) is fixed to the flange FR of the support frame 20 with an adhesive, a screw bolt, or the like.

Each second connection member 52 (flat spring) is deformable in the second direction (y-axis direction). That is, the second connection member 52 (flat spring) can be deformed so as to approach and separate away from the adjacent shaft 24.

Figure 7:
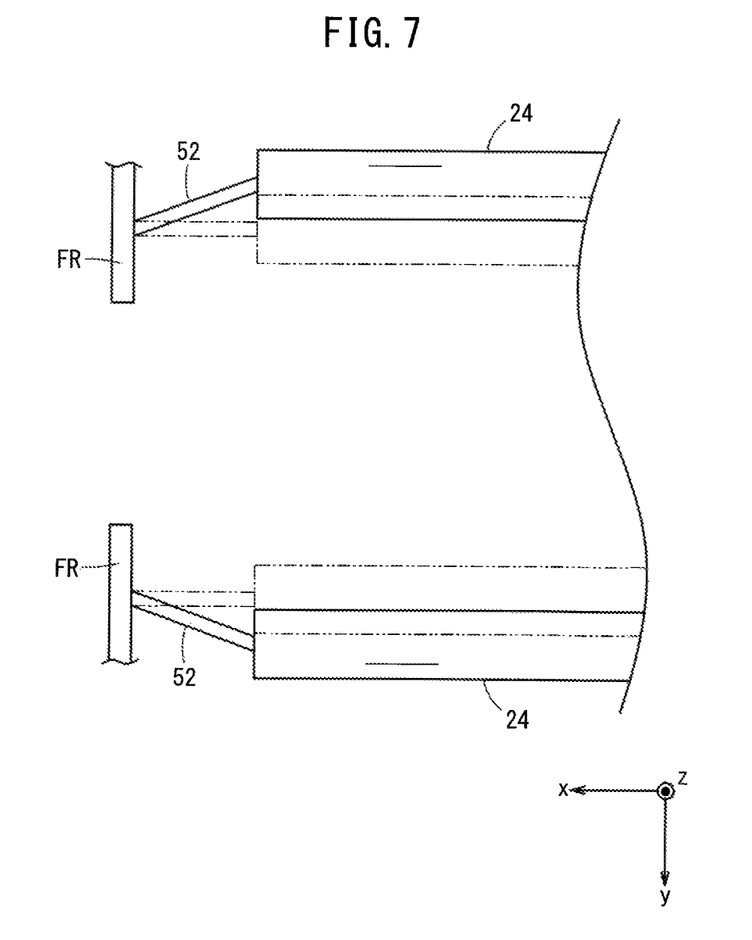
FIG. 7 is a schematic sectional view showing a state when the distance between the shafts is increased.

In this configuration, when one of the shafts 24 is skewed or inclined with respect to the other, the distance between the two shafts 24 varies. As shown in FIG. 7, when the distance between the shafts 24 is larger than in the case where the two shafts 24 are arranged in parallel (two-dot chain line), the second connection member 52 (flat spring) deforms so as to move away from the adjacent shaft 24. Therefore, even if the distance between the shafts 24 increases, hindrance to the sliding operation of the bushes 26 can be alleviated.

Figure 8:
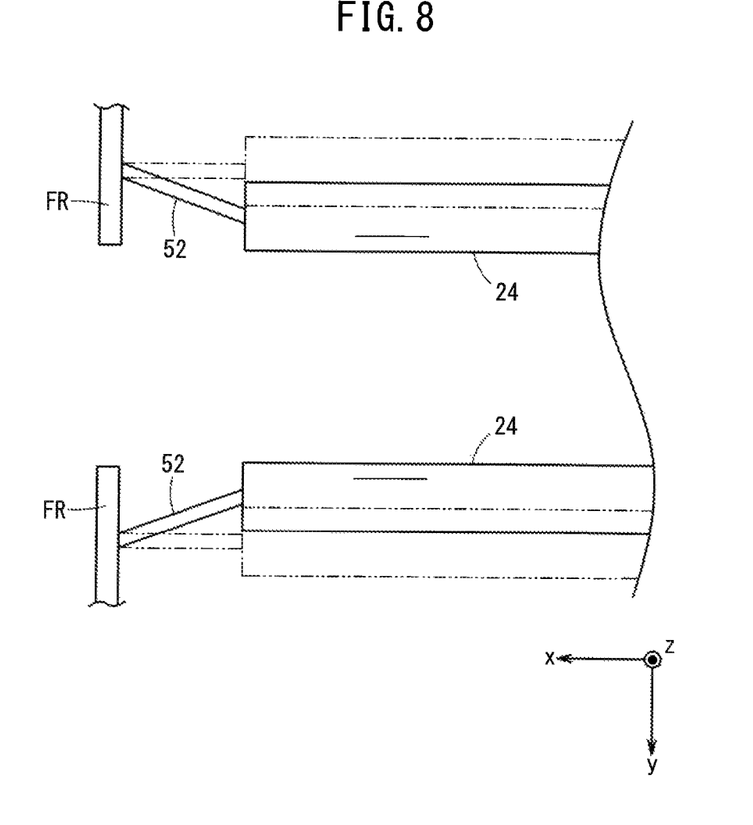
FIG. 8 is a schematic sectional view showing a state when the distance between the shafts is reduced.

On the other hand, as shown in FIG. 8, when the distance between the shafts 24 is smaller than in the case where the two shafts 24 are arranged in parallel (two-dot chain line), the second connection member 52 (flat spring) deforms so as to come closer to the adjacent shaft 24. Therefore, even if the distance between the shafts 24 decreases, hindrance to the sliding operation of the bushes 26 can be alleviated.

In the above way, in the present embodiment, the two shafts 24 are attached in such a manner that the first end (the one end) of each shaft 24 will not move relative to the support frame 20 while the second end (the other end) thereof can move relative to the support frame 20. As a result, even if one of the two shafts 24 is skewed or inclined to the other, the reduction of the movable range of the bushes 26 can be suppressed.

MODIFICATION

The above embodiment may be modified as follows.

Modification 1

Figure 9:
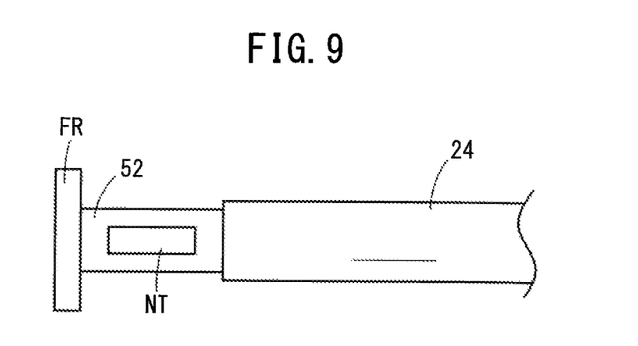
FIG. 9 is a schematic view showing a case of a modification 1, viewed from the same viewpoint as that of FIG. 6.

FIG. 9 is a schematic view showing a modification 1, viewed from the same viewpoint as that of FIG. 6. In FIG. 9, the same reference numerals are allotted to the components equivalent to those described in the above embodiment. In this modification, the description overlapping with the above embodiment will be omitted.

In this modification, each of the second connection members 52 is a flat spring (plate spring) that can be deformed in the second direction (y-axis direction) as in the above embodiment. Each second connection member 52 (flat spring) has one cutout portion NT formed by cutting away part of the second connection member along the first direction (x-axis direction). This enables the second connection member 52 to easily twist in the rotational direction about the axis extending in the first direction (x-axis direction), and thus it is possible to increase the degree of freedom of deformation of the second connection member 52.

Here, multiple cutout portions NT may be formed. When the flat spring has multiple cutout portions NT, the multiple cutout portions NT may be arranged in a row, one or more of the cutout portions NT may be distributed in each of multiple rows, or multiple cutout portions NT may be arranged in an irregular manner.

Modification 2

Figure 10:
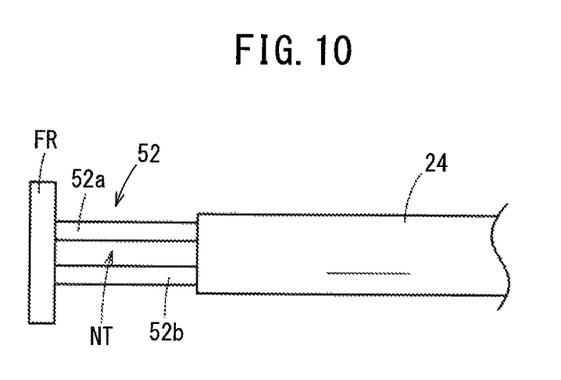
FIG. 10 is a schematic view showing a case of a modification 2, viewed from the same viewpoint as that of FIG. 6.

FIG. 10 is a schematic view showing a modification 2, viewed from the same viewpoint as that of FIG. 6. In FIG. 10, the same reference numerals are allotted to the components equivalent to those described in the above embodiment. In this modification, the description overlapping with the above embodiment will be omitted.

In this modification, each of the second connection members 52 is divided by a cutout portion NT into two portions, i.e., a rod-shaped first divided portion 52a and rod-shaped second divided portion 52b which each have a rectangular cross section. The first divided portion 52a and the second divided portion 52b may have the same shape or different shapes from each other.

As described above, in this modification, since the second connection member 52 is divided into the first divided portion 52a and the second divided portion 52b by the cutout portion NT, this facilitates twisting of the second connection member 52 about the axis extending in the first direction, as in the above modification 1. Therefore, it is possible to increase the degree of freedom of deformation of the second connection member 52.

Here, three or more divided portions may be formed in the second connection member 52. When the second connection member 52 includes three or more divided portions, the multiple divided portions may be arranged in a row, one or two or more divided portions may be are arranged in each of multiple portions, or multiple divided portions may be arranged in an irregular manner.

Modification 3

Figure 11:
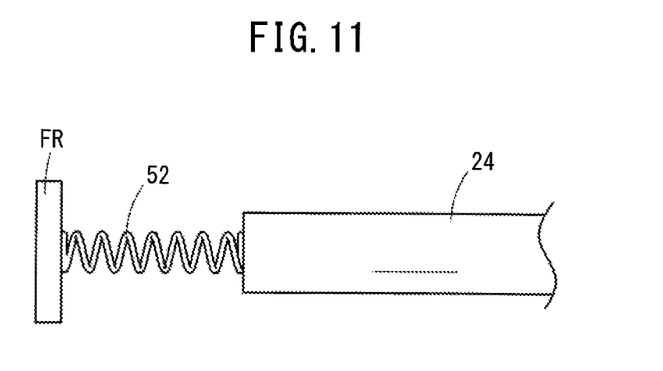
FIG. 11 is a schematic view showing a case of a modification 3, viewed from the same viewpoint as that of FIG. 6.

FIG. 11 is a schematic view showing a case of a modification 3, viewed from the same viewpoint as that of FIG. 6. In FIG. 11, the same reference numerals are allotted to the components equivalent to those described in the above embodiment. In this modification, the description overlapping with the above embodiment will be omitted.

In this modification, each of the second connection members 52 is a coil spring that helically extends in the first direction (x-axis direction). Provision of the second connection member 52 as a coil spring facilitates twisting of the second connection member 52 about the axis extending in the first direction, as in the above modifications 1 and 2, thus making it possible to increase the degree of freedom of deformation of the second connection member 52.

In addition, each of the second connection members 52 may be a rod-shaped spring having a polygonal cross section such as a rectangular cross section, or a rod-shaped spring having a circular cross section including an ellipse, instead of the coil spring. Further, each second connection member 52 may be a plate spring bent in a "U" shape, instead of the coil spring. The bent plate spring is fixed to the second end (the other end) of the shaft 24 in such a manner that the second end of the shaft 24 is located between one end and the other end of the plate spring.

Modification 4

Figure 12:
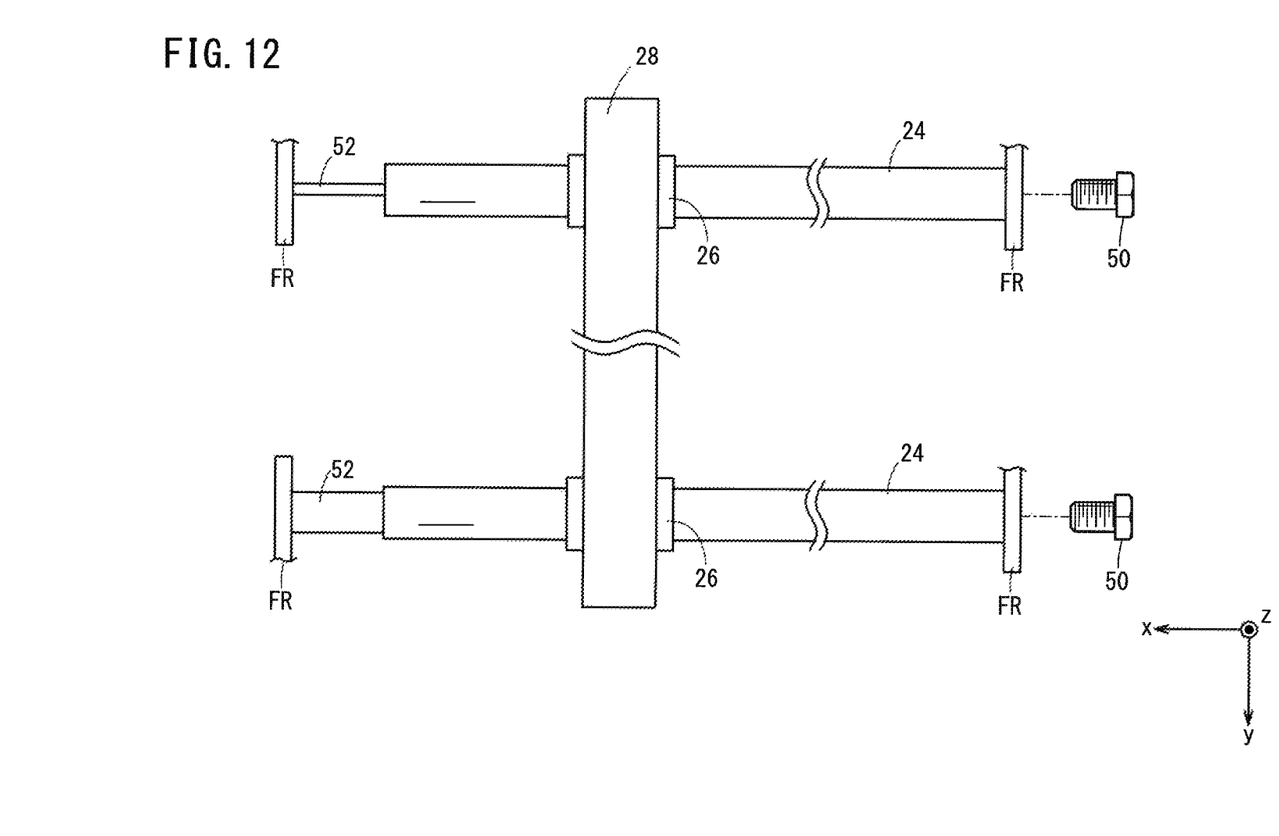
FIG. 12 is a schematic view showing a case of a modification 4, viewed from the same viewpoint as that of FIG. 5.

FIG. 12 is a schematic diagram showing a case of a modification 4, viewed from the same viewpoint as that of FIG. 5. In FIG. 12, the same reference numerals are allotted to the components equivalent to those described in the above embodiment. Further, in FIG. 12, the guide rail 16, the slide 18, the oil pan 40, and the like are omitted. In this modification, the description overlapping with the above embodiment will be omitted.

In this modification, the deformable direction in which the second connection member 52 of one of the two shafts 24 deforms and the deformable direction in which the second connection member 52 of the other shaft 24 deforms are different from each other. This arrangement can increase the degree of freedom of deformation as compared with the case where the second connection members 52 of the two shafts 24 both have the same deformable direction.

In the example of FIG. 12, the second connection member 52 of one of the two shafts 24 is a flat spring (plate spring) that is deformable in the second direction (y-axis direction). The second connection member 52 of the other shaft 24 is a flat spring (plate spring) that is deformable in a third direction that intersects both the first direction (x-axis direction) and the second direction (y-axis direction). The third direction is preferably the z-axis direction orthogonal to both the first direction (x-axis direction) and the second direction (y-axis direction). This configuration can increase the degree of freedom of deformation in the second and the third directions.

Modification 5

Figure 13:
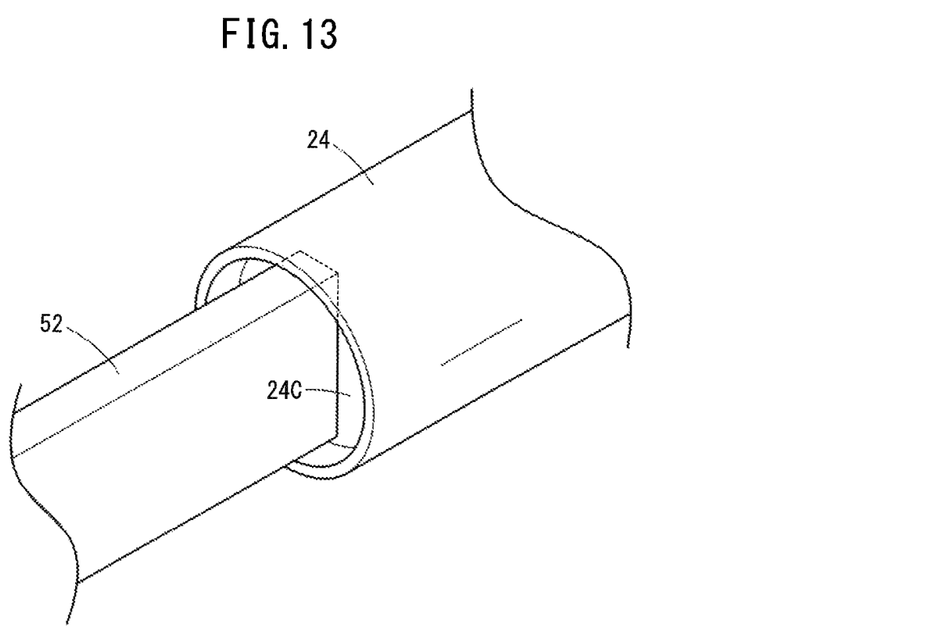
FIG. 13 is a perspective view showing a second end side of a shaft on which a second connection member is provided.

FIG. 13 is a perspective view showing the second end side (the other end side) of the shaft 24 on which the second connection member 52 is provided. Note that FIG. 13 shows one of the two shafts 24. The second end of each of the two shafts 24 includes a recess portion 24C which an end of the second connection member 52 enters, and this end is not in contact with the wall surface of the recess portion 24C. This can increase a length of the second connection member 52 from the shaft 24 to the flange FR of the support frame 20 as compared with the case in which no recess portion 24C is formed. As a result, the amount of deformation of the second connection member 52 can be increased.

Modification 6

In the above embodiment, the two shafts 24 are attached to the flanges FR of the support frame 20. However, the two shafts 24 may be attached to the side walls 20a that face each other in the longitudinal direction of the support frame 20.

Modification 7

In the above embodiment, two shafts 24 are attached to the support frame 20. However, three or more shafts 24 may be provided. When three or more shafts 24 are provided, the first end (one end) of each of the three or more shafts 24 is fixed to the support frame 20 by the first connection member 50, and the second end (the other end) is fixed to the support frame 20 by the second connection member 52. In this case, the modification 4 may also be adopted.

Modification 8

In the above embodiment and the modifications, a fluid bearing is formed between the bush 26 and the shaft 24. However, instead of the fluid bearing, a rolling bearing or a sliding bearing may be provided between the bush 26 and the shaft 24.

Modification 9

The above embodiment and the above modifications may be arbitrarily combined as long as no technical inconsistency occurs.

Invention

The aspects of the invention that can be obtained from the above embodiment and modifications will be described as follows.

The present invention resides in a support structure for supporting an expandable cover (14), the support structure including: at least two shafts (24) extending in a first direction in which the cover (14) expands and contracts, and arranged inside the cover (14) so as to be spaced from each other in a second direction that intersects the first direction; a shaft support member (20) configured to support the at least two shafts (24); a bush (26) provided on each of the at least two shafts (24) and configured to be slidable along the shaft; a cover support member (28) connected to a plurality of the bushes (26) and configured to support the cover (14); a first connection member (50) configured to connect a first end (one end) of each of the at least two shafts (24) to the shaft support member (20) in such a manner that the relative position between the shaft (24) and the shaft support member (20) will not change; and a second connection member (52) configured to connect the second end (the other end) of each of the at least two shafts (24) to the shaft support member (20) in such a manner that the relative position between the shaft (24) and the shaft support member (20) can change.

As a result, even if the distance between the two shafts (24) becomes uneven due to a failure to install the shafts (24) in parallel, the relative position of each shaft (24) to the shaft support member (20) can change by the action of the second connection member (52), so that the distance between the two shafts (24) can be adjusted to be substantially uniform. Therefore, even if the shafts (24) are not installed in parallel, it is possible to suppress the reduction of the movable range of the bushes (26).

The second connection member (52) may be configured to be deformable. Thus, deformation of the second connection members (52) makes it possible to make the distance between the two shafts (24) substantially uniform.

The second connection member (52) may be a flat spring, and the flat spring has a cutout portion (NT) formed by cutting away a portion of the flat spring along the first direction. This configuration facilitates twisting of the second connection member (52) about the axis extending in the first direction, and hence it is possible to increase the degree of freedom of deformation of the second connection member (52).

The deformable direction in which the second connection member (52) of one of the at least two shafts (24) deforms and the deformable direction in which the second connection member (52) of the other of the at least two shafts (24) deforms may be set different from each other. This arrangement can increase the degree of freedom of deformation as compared with the case where the second connection members (52) of the two shafts (24) both have the same deformable direction.

The second connection member (52) of one of the at least two shafts (24) may be deformable in the second direction while the second connection member (52) of the other of the at least two shafts (24) may be deformable in a third direction that intersects both the first and second directions. This configuration makes it possible to increase the degree of freedom of deformation in the second and third directions.

The second end (the other end) of each of the at least two shafts (24) may include a recess portion (24C) which an end of the second connection member (52) enters, and the end of the second connection member may be kept out of contact with the wall of the recess portion (24C). This can increase the length of the second connection member (52) from the shaft (24) to the shaft support member (20) as compared with the case where no recess portion (24C) is formed. As a result, the amount of deformation of the second connection member (52) can be increased.

The present invention is not particularly limited to the embodiment described above, and various modifications are possible without departing from the essence and gist of the present invention.

What is claimed is:

1. A support structure for supporting an expandable cover, comprising:
    at least two shafts extending in a first direction in which the cover expands and contracts, and arranged inside the cover so as to be spaced from each other in a second direction that intersects the first direction;
    a shaft support member configured to support the at least two shafts;
    a bush provided on each of the at least two shafts and configured to be slidable along the shaft;
    a cover support member connected to a plurality of the bushes and configured to support the cover;
    a first connection member configured to connect a first end of each of the at least two shafts to the shaft support member so as not to change a relative position between the shaft and the shaft support member; and
    a second connection member disposed between a second end of each of the at least two shafts and the shaft support member and is configured to connect the second end of each of the at least two shafts to the shaft support member in a manner that the relative position between the shaft and the shaft support member is changeable.

2. The support structure according to claim 1, wherein the second connection member is configured to be deformable.

3. The support structure according to claim 2, wherein the second connection member is a flat spring, and the flat spring includes a cutout portion formed by cutting away a portion of the flat spring along the first direction.

4. The support structure according to claim 2, wherein a deformable direction in which the second connection member of one of the at least two shafts deforms and a deformable direction in which the second connection member of another of the at least two shafts deforms are different from each other.

5. The support structure according to claim 4, wherein the second connection member of one of the at least two shafts is deformable in the second direction while the second connection member of another of the at least two shafts is deformable in a third direction that intersects both the first and second directions.

6. A support structure for supporting an expandable cover, comprising:
    at least two shafts extending in a first direction in which the cover expands and contracts, and arranged inside the cover so as to be spaced from each other in a second direction that intersects the first direction;
    a shaft support member configured to support the at least two shafts;
    a bush provided on each of the at least two shafts and configured to be slidable along the shaft;
    a cover support member connected to a plurality of the bushes and configured to support the cover;
    a first connection member configured to connect one end of each of the at least two shafts to the shaft support member so as not to change a relative position between the shaft and the shaft support member; and
    a second connection member configured to connect another end of each of the at least two shafts to the shaft support member in a manner that the relative position between the shaft and the shaft support member is changeable,
    wherein the other end of each of the at least two shafts includes a recess portion which an end of the second connection member enters, and the end of the second connection member is not in contact with a wall of the recess portion.

7. The support structure according to claim 1, wherein the second end of each of the at least two shafts is separated from the shaft support member via the second connection member.

8. The support structure according to claim 1, wherein the second end of each of the at least two shafts connects to a first end of the second connection member, and
    wherein the shaft support member connects to a second end of the second connection member.

9. The support structure according to claim 1, wherein the second end of each of the at least two shafts is devoid of a direct contact with the shaft support member.

10. The support structure according to claim 1, wherein the second connection member is formed separately from the shaft.

11. The support structure according to claim 1, wherein the second connection member dynamically moves in the second direction as a result of a movement of the cover.

12. The support structure according to claim 1, wherein the second connection member dynamically deforms in the first direction as a result of a movement of the cover.

13. The support structure according to claim 1, wherein the second connection member dynamically moves in the second direction as a result of a movement of the cover, and wherein the second connection member dynamically deforms in the first direction as a result of a movement of the cover.

14. The support structure according to claim 1, wherein the second connection member deforms to compensate for a skew between the at least two shafts such that the at least two shafts maintain a parallel relationship between the at least two shafts.

15. The support structure according to claim 1, wherein the second end of the at least two shafts, via the second connection member, moves relative to the support frame in directions other than the first direction.

* * * * *